US010297843B2

(12) United States Patent
Norimoto (10) Patent No.: US 10,297,843 B2
(45) Date of Patent: May 21, 2019

(54) INSPECTION METHOD OF FUEL CELL (71) Applicant: TOYOTA JIDOSHA KABUSHIKI KAISHA, Toyota-shi, Aichi-ken (JP)

(72) Inventor: Michito Norimoto, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 736 days.

(21) Appl. No.: 14/965,022

(22) Filed: Dec. 10, 2015

(65) Prior Publication Data
US 2016/0172694 A1 Jun. 16, 2016

(30) Foreign Application Priority Data

Dec. 12, 2014 (JP) .................................. 2014-251660

(51) Int. Cl.
H01M 8/04537 (2016.01)
H01M 8/04089 (2016.01)
H01M 8/1018 (2016.01)

(52) U.S. Cl.
CPC ... *H01M 8/04089* (2013.01); *H01M 8/04552* (2013.01); *H01M 2008/1095* (2013.01)

(58) Field of Classification Search
CPC ......... H01M 8/04089; H01M 8/04552; H01M 2008/1095; H01M 8/04544; H01M 8/04574; H01M 8/04582; H01M 8/04873; G01R 31/36
USPC .................................. 324/426, 430, 432, 434
See application file for complete search history.

(56) References Cited

U.S. PATENT DOCUMENTS

| 7,527,882 B2 * | 5/2009 | Inai ................... H01M 8/04089 429/444 |
| 2004/0124843 A1 * | 7/2004 | Hamada ............ H01M 8/04007 324/434 |
| 2005/0271911 A1 | 12/2005 | Kuriki et al. |

(Continued)

FOREIGN PATENT DOCUMENTS

| DE | 102006051320 A1 | 4/2008 |
| JP | 2002-208424 A | 7/2002 |

(Continued)

OTHER PUBLICATIONS

I. Radev, "Proton Conductivity Measurements of PEM Performed in EasyTest Cell," International Journal of Hydrogen Energy, 33, (2008), pp. 4849-4855.

Primary Examiner — Renee S Luebke
Assistant Examiner — Paul Baillargeon
(74) Attorney, Agent, or Firm — Finnegan, Henderson, Farabow, Garrett & Dunner, LLP (57) ABSTRACT A MEA is set in a state where a hydrogen gas is continuously supplied to both an anode-side electrode and a cathode-side electrode. In this state, a current is applied from an external power supply unit to the anode-side electrode and the cathode-side electrode so that the cathode-side electrode has a higher potential and that the current value gradually increases. Upon applying the current in this way, measured voltages between both electrodes measured by a voltage measurement unit are plotted in time series, thereby measuring the voltage transition across the inspection object MEA. A power generation performance inspection of the inspection object MEA is carried out based on the measured voltage transition.

5 Claims, 7 Drawing Sheets (56) References Cited

U.S. PATENT DOCUMENTS

| | | | |
|---|---|---|---|
| 2007/0172708 A1* | 7/2007 | Takebe | G01R 31/3679 429/431 |
| 2007/0259256 A1* | 11/2007 | Le Canut | H01M 8/04089 429/90 |
| 2013/0166222 A1 | 6/2013 | Peng et al. | |

FOREIGN PATENT DOCUMENTS

| | | |
|---|---|---|
| JP | 2005-276729 | 10/2005 |
| JP | 2006-351324 A | 12/2006 |
| JP | 2008-176944 A | 7/2008 |
| JP | 2009-205988 A | 9/2009 |
| JP | 2011-28965 | 2/2011 |

\* cited by examiner

INSPECTION METHOD OF FUEL CELL

INCORPORATION BY REFERENCE

The disclosure of Japanese Patent Application No. 2014-251660 filed on Dec. 12, 2014 including the specification, drawings and abstract is incorporated herein by reference in its entirety.

BACKGROUND OF THE INVENTION

1. Field of the Invention

The invention relates to an inspection method of a fuel cell.

2. Description of Related Art

A fuel cell includes an anode-side electrode and a cathode-side electrode with an electrolyte membrane interposed therebetween and is configured to be supplied with a hydrogen gas at the anode-side electrode and an oxidizing gas containing oxygen at the cathode-side electrode, thereby generating electric power. Fuel cells are used in various ways such as obtaining electric power for driving vehicles and obtaining transmission electric power in power generation plants. Accordingly, a fuel cell is, for example, required to have a certain power generation performance from the first or required to be confirmed by maintenance/inspection or the like as to whether or not its power generation capability is maintained and, in view of this, its inspection technique is proposed (e.g. Japanese Patent Application Publication No. 2011-28965 (JP 2011-28965 A)).

In the meantime, the electric power is generated due to proton conduction such that protons ($H^+$) move from the anode-side electrode to the cathode-side electrode through the electrolyte membrane and, hence, the electrolyte membrane is required to have a property that does not hinder the proton conduction. It is known that the proton conductivity of an electrolyte membrane is reduced due to a decrease in the purity of a polymer resin such as a perfluorosulfonic acid resin forming the electrolyte membrane, in other words, due to incorporation of foreign matter into the polymer resin, i.e. due to contamination of the polymer resin. However, in the inspection technique proposed in JP 2011-28965 A, although an inspection of various items is efficiently carried out while supplying a hydrogen gas and an oxidizing gas to a fuel cell to generate electric power, nothing is done for inspection of the power generation performance derived from the property of an electrolyte membrane. Under these circumstances, it has been required to provide a new inspection technique for the power generation performance derived from the property of an electrolyte membrane.

SUMMARY OF THE INVENTION

The invention can be carried out in the following modes.

(1) According to one mode of the invention, there is provided a fuel cell inspection method. This fuel cell inspection method is an inspection method of a fuel cell in which an electrolyte membrane is sandwiched between an anode-side electrode and a cathode-side electrode, including: supplying a hydrogen gas to one of the anode-side electrode and the cathode-side electrode and supplying the hydrogen gas or an inert gas to the other electrode; applying a current from an external power supply to the one electrode and the other electrode so that the one electrode has a higher potential, and measuring a potential difference between the one electrode and the other electrode; and inspecting a performance of the fuel cell based on the potential difference between the one electrode and the other electrode measured when the current of a predetermined current value is applied from the external power supply to the one electrode and the other electrode, and an initial potential difference which is a potential difference between the one electrode and the other electrode before applying the current from the external power supply to the one electrode and the other electrode.

In the fuel cell inspection method of the above-described mode, the supply of the gases creates the state where the hydrogen gas is present at the one electrode, while the hydrogen gas or the inert gas is present at the other electrode. In this state, the current is applied from the external power supply to the one electrode and the other electrode so that the one electrode has a higher potential. Accordingly, a hydrogen molecule is ionized into protons ($H^+$) and electrons ($e^-$) at the high-potential one electrode where the hydrogen gas is present, and then the protons move from the one electrode to the other electrode through the electrolyte membrane. The protons thus moved are bonded together in the presence of electrons to become a hydrogen molecule at the other electrode. Since the chemical reactions at both electrodes across the electrolyte membrane occur only based on the movement of the protons, the progress of the chemical reactions at both electrodes is affected by the degree of proton conductivity of the electrolyte membrane, i.e. the state of contamination of the electrolyte membrane.

The chemical reactions at both electrodes across the electrolyte membrane occur at any current value of the current applied from the external power supply to the one electrode and the other electrode. When the proton conductivity of the electrolyte membrane is normal, the measured potential difference between the one electrode and the other electrode at any current value is equal to or only differs within a predetermined range from the initial potential difference which is a potential difference between the one electrode and the other electrode before applying the current from the external power supply to the one electrode and the other electrode. However, when the proton conductivity of the electrolyte membrane is hindered due to contamination, the production of hydrogen molecules by bonding of the protons at the other electrode due to the movement of the protons is difficult to occur so that non-bonding of the protons is actualized as the current increases, thus leading to a decrease in the measured potential difference between the one electrode and the other electrode. Since the fuel cell inspection method of the above-described mode inspects the performance of the fuel cell based on the measured potential difference when the current of a predetermined current value is applied and the initial potential difference, if the measured potential difference is a potential difference that is greater than the initial potential difference by a predetermined amount, it is possible to determine that the power generation performance is defective. As a result, according to the fuel cell inspection method of the above-described mode, it is possible to inspect the power generation performance derived from the property of the electrolyte membrane, i.e. the hindrance of the proton conductivity due to contamination.

(2) In the fuel cell inspection method of the above-described mode, when supplying the hydrogen gas to the one of the anode-side electrode and the cathode-side electrode and supplying the hydrogen gas or the inert gas to the other electrode, the hydrogen gas may be supplied to both the anode-side electrode and the cathode-side electrode. With this configuration, since the one electrode and the other electrode sandwiching the electrolyte membrane therebetween are both in the presence of the hydrogen gas, the initial potential difference becomes equivalent to a theoretical potential difference between both electrodes theoretically obtained in the state where the hydrogen gas is present at the one electrode and also at the other electrode. Therefore, a defective/non-defective determination of the power generation performance based on a voltage decrease is facilitated. Further, since an inert gas purge is not required after the completion of the inspection, it is possible to reduce the number of inspection steps and the inspection cost.

In the fuel cell inspection method of the above-described mode, the current may be applied to the anode-side electrode and the cathode-side electrode so that the current value gradually increases.

In the fuel cell inspection method of the above-described mode, when supplying the hydrogen gas to the one of the anode-side electrode and the cathode-side electrode and supplying the hydrogen gas or the inert gas to the other electrode, the hydrogen gas may be supplied to the anode-side electrode and the inert gas may be supplied to the cathode-side electrode.

In the fuel cell inspection method of the above-described mode, electrode parts as voltage measurement points by a voltage measurement unit may be provided in a matrix at each of the anode-side electrode and the cathode-side electrode disposed on an opposite side of the electrolyte membrane from the anode-side electrode, thereby obtaining voltages from the respective electrode parts to measure the voltages for the respective electrode parts.

The invention can be embodied in various modes and, for example, can be applied also to a method and apparatus for inspecting a membrane electrode assembly in which an electrolyte membrane is sandwiched between an anode-side electrode and a cathode-side electrode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
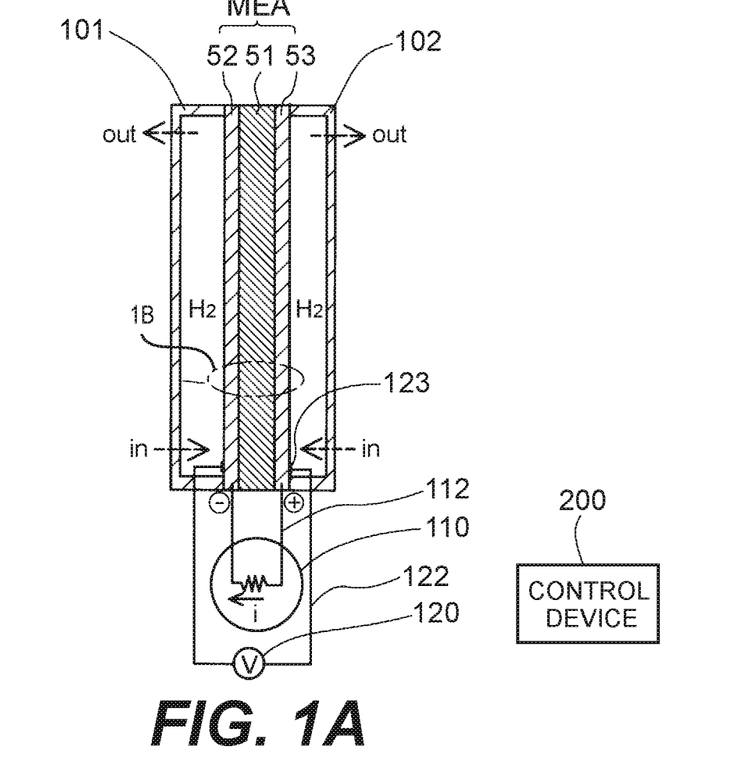
FIG. 1A is an explanatory diagram showing an outline of a fuel cell inspection method, including a device configuration, according to a first embodiment.
Figure 1B:
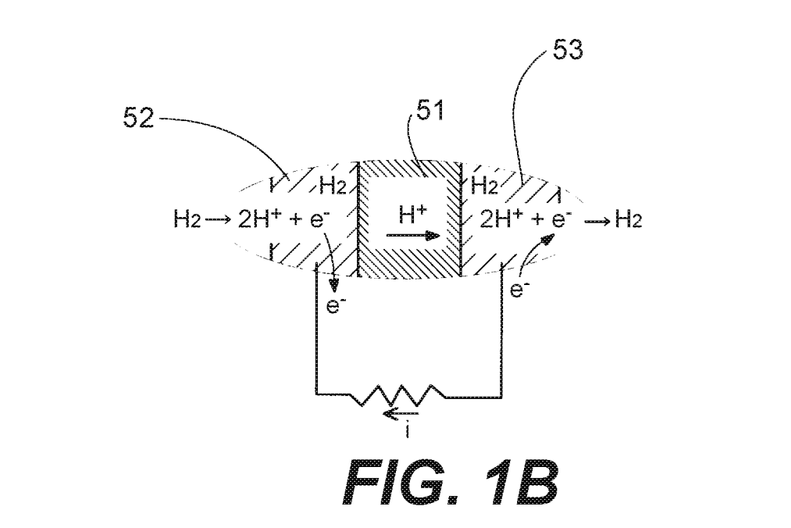
FIG. 1B is an explanatory diagram showing details relating to portion 1B of FIG. 1A.

Hereinbelow, embodiments of the invention will be described with reference to the drawings. FIG. 1A and FIG. 1B are explanatory diagrams showing an outline of a fuel cell inspection method, including a device configuration, according to a first embodiment. As shown in FIG. 1A and FIG. 1B, in this inspection method, a membrane electrode assembly (MEA) of a battery cell forming a fuel cell is used as an inspection object. The MEA includes an anode-side electrode 52 and a cathode-side electrode 53 on both sides of an electrolyte membrane 51, respectively. The electrolyte membrane 51 is a proton-conductive ion exchange membrane made of a solid polymer material such as a fluorine-based resin (perfluorosulfonic acid-based resin) and exhibits excellent electrical conductivity in a wet state.

The anode-side electrode 52 and the cathode-side electrode 53 are each an electrode catalyst layer formed by coating an ionomer having proton conductivity on conductive particles such as carbon particles carrying a catalyst such as platinum or a platinum alloy (hereinafter referred to as "catalyst-carrying carbon particles"). Normally, the ionomer is a polymer electrolyte resin being a solid polymer material of the same property as the electrolyte membrane 51 (e.g. the fluorine-based resin described above) and has proton conductivity due to an ion exchange group contained therein. In this embodiment, a carbon black as catalyst-carrying carbon particles carries platinum (Pt) in an amount of 30 wt % and Nafion (registered trademark) manufactured by E.I. du Pont de Nemours and Company is used as the ionomer.

Normally, the MEA is used in a state sandwiched between a conductive anode-side gas diffusion layer and a conductive cathode-side gas diffusion layer each having gas permeability, and separators for forming gas supply flow paths are disposed outside the gas diffusion layers, respectively. Since this configuration is not directly related to the gist of the invention, a detailed description thereof will be omitted herein.

In order to inspect the power generation performance of the MEA, the inspection method of this embodiment uses gas introducing members 101 and 102, an external power supply unit 110, a voltage measurement unit 120, and a control device 200. The gas introducing members 101 and 102 individually cover the anode-side electrode 52 and the cathode-side electrode 53 in a gastight manner and are respectively configured to be able to supply a hydrogen gas to the anode-side electrode 52 and the cathode-side electrode 53 from an external gas supply source such as a hydrogen gas tank.

The external power supply unit 110 is connected to the anode-side electrode 52 and the cathode-side electrode 53 via a power supply line 112 and applies a current to the anode-side electrode 52 and the cathode-side electrode 53 so that the anode-side electrode 52 has a higher potential. Further, under the control of the control device 200, the external power supply unit 110 applies the current to both electrodes so that the current value gradually increases as will be described later.

The voltage measurement unit 120 is connected to the anode-side electrode 52 and the cathode-side electrode 53 via a measurement line 122 extending from predetermined electrode parts 123 of the anode-side electrode 52 and the cathode-side electrode 53 disposed on an opposite side of the electrolyte membrane 51 from the anode-side electrode 52. The voltage measurement unit 120 constantly measures a potential difference between the anode-side electrode 52 and the cathode-side electrode 53 and outputs the measurement result (measured potential difference) to the control device 200.

The control device 200 is configured as a computer including a CPU configured to perform logical operations, a ROM, a RAM, and so on and supervises the control of gas supply to the gas introducing members 101 and 102, the control of current applied to the electrodes by the external power supply unit 110, the power generation performance determination based on measured potential differences obtained from the voltage measurement unit 120, and so on.

Figure 2:
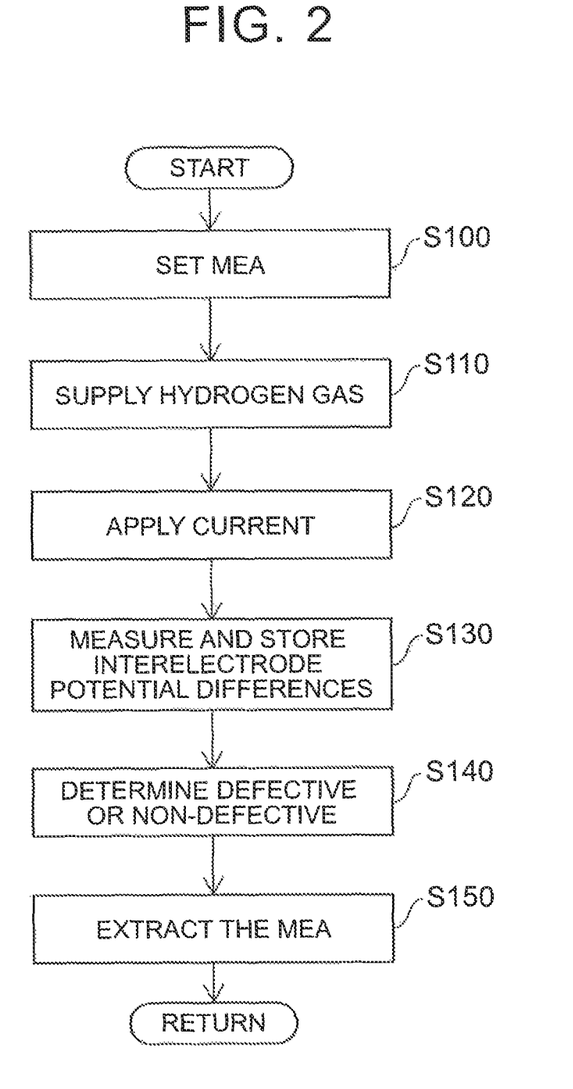
FIG. 2 is an explanatory diagram showing the sequence of the fuel cell inspection method according to the first embodiment.
Figure 3A:
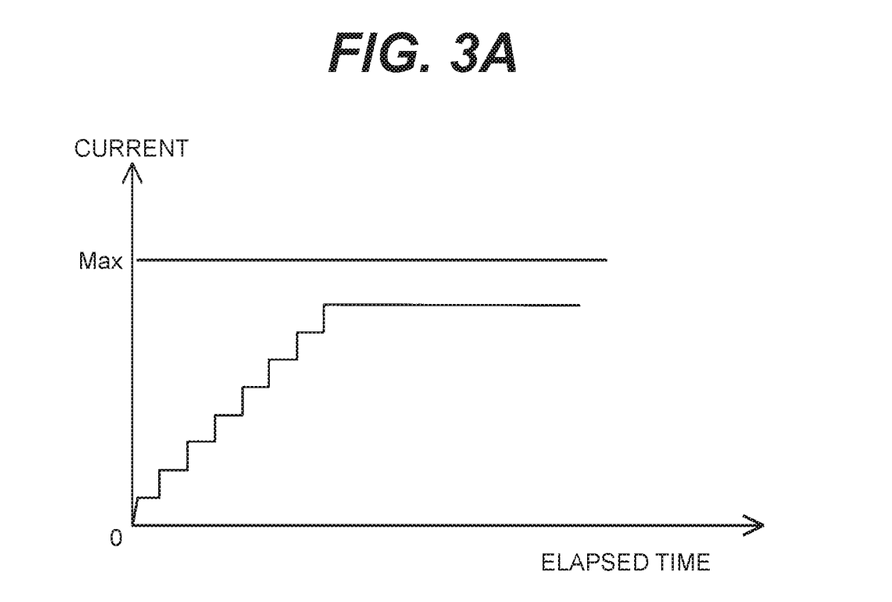
FIG. 3A and FIG. 3B are explanatory diagrams schematically showing a procedure of fuel cell inspection and a state of fuel cell performance determination.

Next, an inspection of the power generation performance of the MEA will be described. FIG. 2 is an explanatory diagram showing the sequence of the fuel cell inspection method according to the first embodiment and FIG. 3A and FIG. 3B are explanatory diagrams schematically showing a procedure of fuel cell inspection and a state of fuel cell performance determination.

At the start of the power generation performance inspection, the MEA is set in the gas introducing members 101 and 102 as shown in FIG. 1A and FIG. 1B (step S100). Then, under the control of the control device 200, a hydrogen gas is continuously supplied to the anode-side electrode 52 and the cathode-side electrode 53 (step S110). This creates a state where the hydrogen gas is present at the anode-side electrode 52 and also at the cathode-side electrode 53. Under the continuous supply of the hydrogen gas, the control device 200 controls driving of the external power supply unit 110 to apply a current to the anode-side electrode 52 and the cathode-side electrode 53 so that the anode-side electrode 52 has a higher potential (step S120). In this event, as shown in FIG. 3A, the control device 200 applies the current to both electrodes so that the current value gradually increases. The upper limit of the current value is set to 90 to 95% of the maximum current value allowed for the MEA in design. This makes it possible to avoid damage to the MEA due to the performance inspection. The current may be applied so that the upper limit current value is reached in a relatively short time.

Figure 3B:
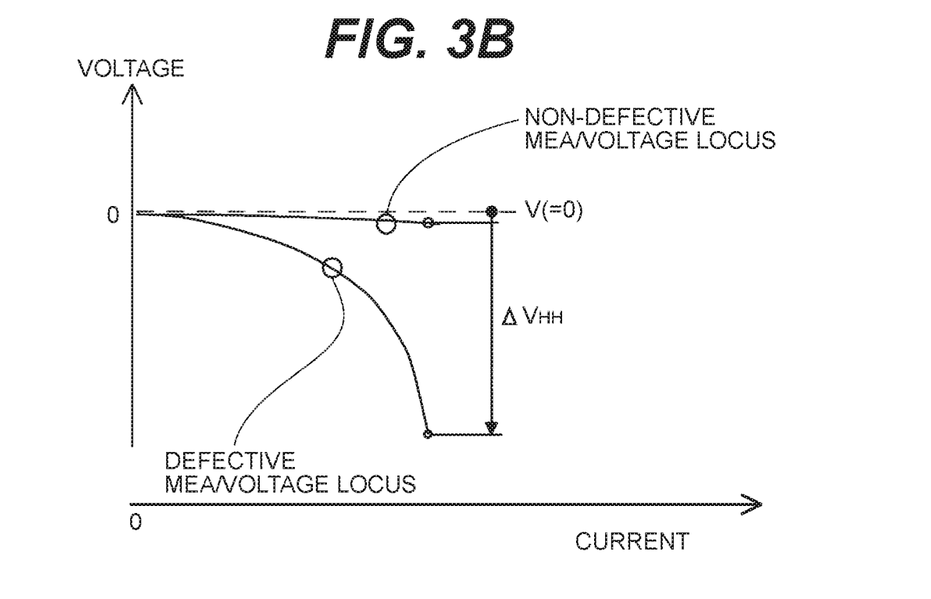

After controlling the external power supply unit 110 to apply the current, the control device 200 receives measured potential differences from the voltage measurement unit 120 and plots (stores) those potential differences in time series, thereby measuring the voltage transition across the inspection object MEA as shown in FIG. 3B (step S130). Then, it is determined from the measured voltage transition whether the power generation performance of the inspection object MEA is good or bad as will be described hereinbelow, so that the performance inspection in this embodiment is completed (step S140).

By the continuous supply of the hydrogen gas as described above, the MEA is in the state where the hydrogen gas is present at the anode-side electrode 52 and also at the cathode-side electrode 53. In this state, the current is applied from the external power supply unit 110 to the anode-side electrode 52 and the cathode-side electrode 53 so that the cathode-side electrode 53 has a higher potential and that the current value gradually increases. Accordingly, at the low-potential anode-side electrode 52 where the hydrogen gas is present, a hydrogen molecule is ionized into protons ($H^+$) and electrons ($e^-$) as exemplarily shown in FIG. 1B. The ionized protons move from the anode-side electrode 52 to the cathode-side electrode 53 through the electrolyte membrane 51. The protons thus moved are bonded together in the presence of electrons to become a hydrogen molecule at the cathode-side electrode 53. Since the chemical reactions at the anode-side electrode 52 and the cathode-side electrode 53 across the electrolyte membrane 51 occur only based on the movement of the protons, the progress of the chemical reactions at both electrodes is affected by the degree of proton conductivity of the electrolyte membrane 51, i.e. the state of contamination of the electrolyte membrane 51.

The chemical reactions at both electrodes across the electrolyte membrane 51 occur at any current value of the current applied from the external power supply unit 110. In the case of the MEA having the electrolyte membrane 51 with normal proton conductivity (non-defective MEA), the measured potential difference measured between the anode-side electrode 52 and the cathode-side electrode 53 by the voltage measurement unit 120 at any current value is equal to or only differs within a predetermined range from an initial potential difference which is a potential difference between the anode-side electrode 52 and the cathode-side electrode 53 before the current application in the state where the hydrogen gas is present at both the anode-side electrode 52 and the cathode-side electrode 53. In this case, although not causing hindrance to the proton conductivity due to contamination, even the non-defective MEA has some resistance, other than contamination, to hinder the movement of the protons. Accordingly, while the initial potential difference across the non-defective MEA is equivalent to a theoretical potential difference (=0V) between the anode-side electrode 52 and the cathode-side electrode 53 theoretically obtained in the state where the hydrogen gas is present at both the anode-side electrode 52 and the cathode-side electrode 53, the measured potential difference across the non-defective MEA slightly decreases from the initial potential difference as the current increases. This state is shown as NON-DEFECTIVE MEA/VOLTAGE LOCUS in the voltage transition in FIG. 3B.

In the meantime, there are cases where the proton conductivity of the electrolyte membrane 51 is hindered by contamination. In the case of the MEA having the electrolyte membrane 51 with the thus hindered proton conductivity (defective MEA), the production of hydrogen molecules by bonding of the protons at the cathode-side electrode 53 due to the movement of the protons is difficult to occur so that non-bonding of the protons is actualized as the current increases, thus leading to a decrease of the measured potential difference ($\Delta V_{HH}$) measured between the anode-side electrode 52 and the cathode-side electrode 53. This state is shown as DEFECTIVE MEA/VOLTAGE LOCUS in the voltage transition in FIG. 3B. The control device 200 stores, in a correlated manner, degrees of decrease in the potential difference ($\Delta V_{HH}$) and defective/non-defective determination results in a predetermined memory. Accordingly, if the measured potential difference when the current of a predetermined current value is applied is a potential difference that is largely reduced by a predetermined amount or more from the above-described initial potential difference, specifically, if the potential difference ($\Delta V_{HH}$) when the current of a predetermined current value such as a current density of about 1.2 A/cm$^2$ is applied is reduced to less than a predetermined potential difference of about −0.3V, the control device 200 can determine that the inspection object MEA has a power generation performance defect due to the property of the electrolyte membrane 51, i.e. the hindrance of the proton conductivity of the electrolyte membrane 51 by contamination. On the other hand, if the potential difference ($\Delta V_{HH}$) when the current of a predetermined current value is applied falls within a predetermined potential difference range or shows no potential difference decrease, the control device 200 can determine that the inspection object MEA has no power generation performance defect due to the property of the electrolyte membrane 51 and thus is non-defective. This defective/non-defective determination is a result of inspection based on the measured potential difference when the current of a predetermined current value is applied and the initial potential difference which is a potential difference between both electrodes before the current application. After the completion of the inspection, the MEA is extracted (step S150) and the non-defective MEA is incorporated into a power generation cell so as to be a constituent member of a fuel cell. Since the measured potential differences, i.e. the relationship between the current density and the voltage decrease degree, are affected by the thickness of the electrolyte membrane 51 in the power generation performance inspection, the current densities and the voltage decrease degrees should be defined taking into account the thickness of the electrolyte membrane 51.

As described above, according to the fuel cell inspection method of this embodiment, the quality of the power generation performance derived from the property of the electrolyte membrane 51 can be easily inspected by the sequence of supplying a hydrogen gas to both the anode-side electrode 52 and the cathode-side electrode 53, applying a current to both electrodes under the supply of the hydrogen gas, and measuring a voltage between both electrodes when the current of a predetermined current value is applied thereto.

According to the fuel cell inspection method of this embodiment, since the anode-side electrode 52 and the cathode-side electrode 53 sandwiching the electrolyte membrane 51 therebetween are both in the presence of a hydrogen gas, the above-described initial potential difference becomes 0V equivalent to the theoretical potential difference. Therefore, according to the fuel cell inspection method of this embodiment, a defective/non-defective determination of the power generation performance based on a voltage decrease is facilitated.

Figure 4A:
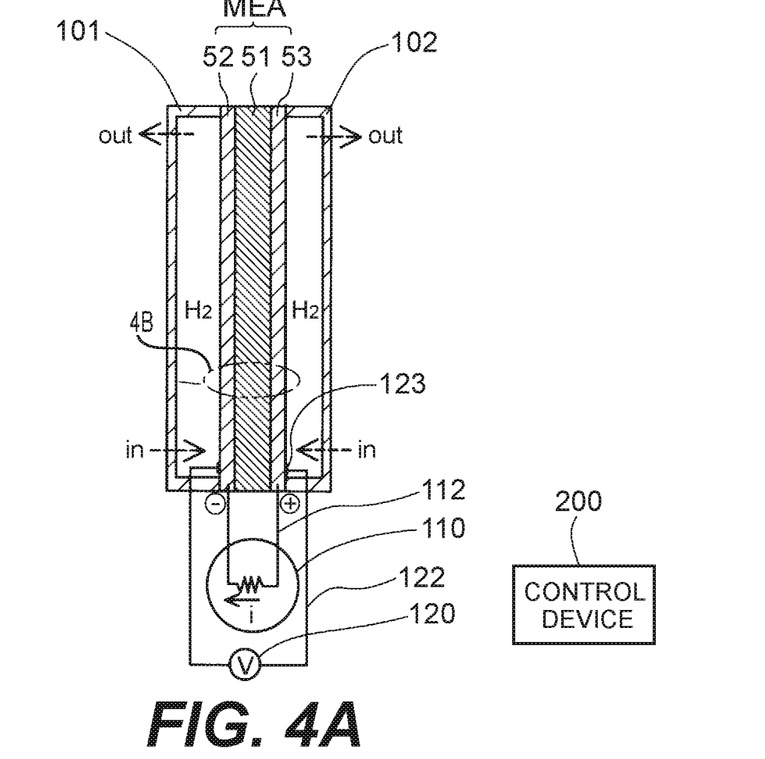
FIG. 4A is an explanatory diagram showing an outline of a fuel cell inspection method according to a second embodiment in the same way as in FIG. 1A and FIG. 1B.
Figure 4B:
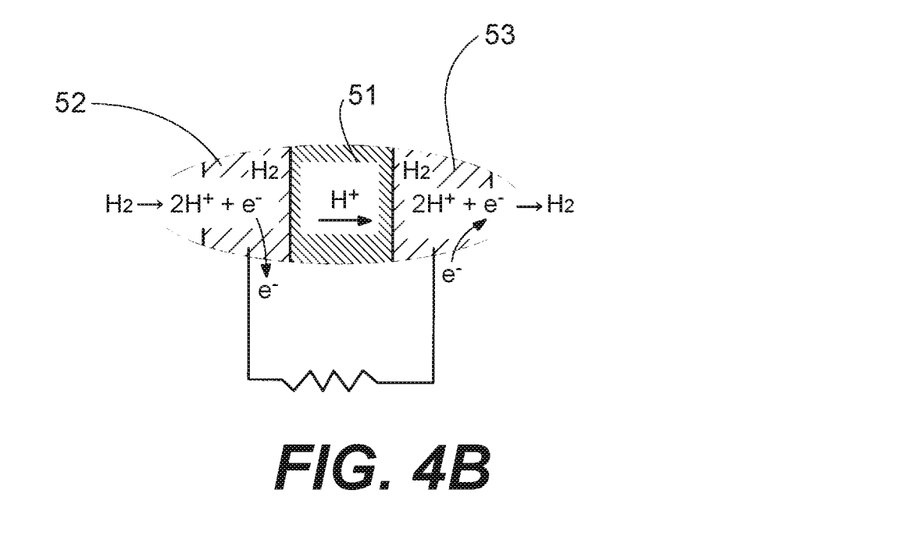
FIG. 4B is an explanatory diagram showing details relating to portion 4B of FIG. 4A.
Figure 5A:
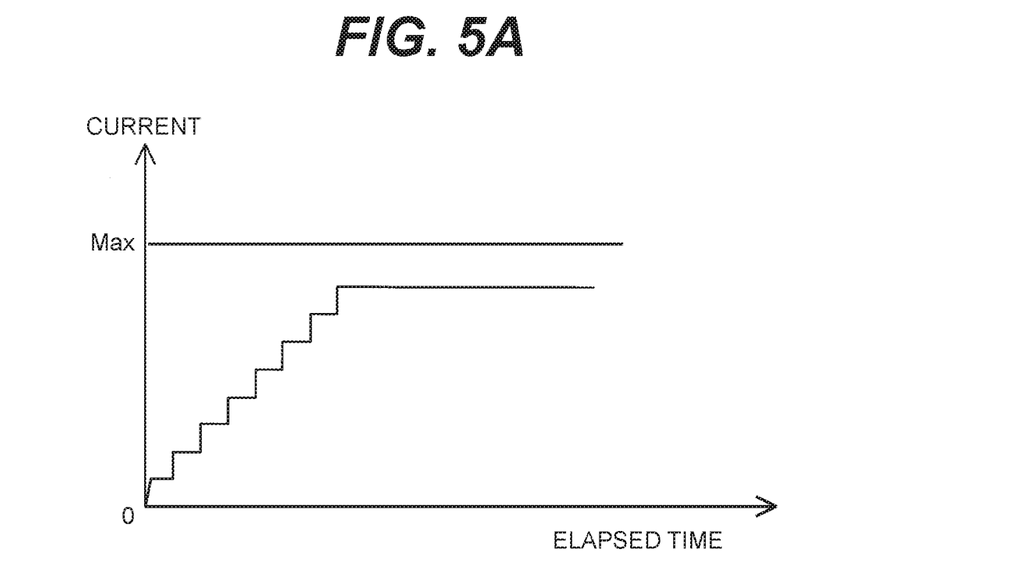
FIG. 5A and FIG. 5B are explanatory diagrams showing a procedure of fuel cell inspection and a state of fuel cell performance determination in the same way as in FIG. 3A and FIG. 3B.
Figure 5B:
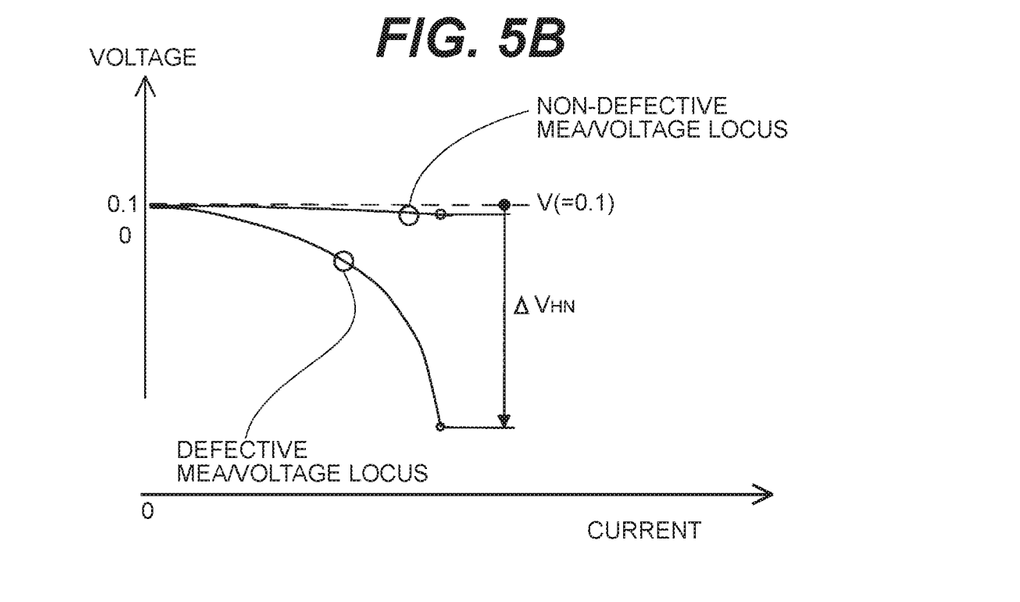

Next, a fuel cell inspection method according to a second embodiment will be described. FIG. 4A and FIG. 4B are explanatory diagrams showing an outline of the fuel cell inspection method according to the second embodiment in the same way as in FIG. 1A and FIG. 1B. FIG. 5A and FIG. 5B are explanatory diagrams showing a procedure of fuel cell inspection and a state of fuel cell performance determination in the same way as in FIG. 3A and FIG. 3B. As shown in FIG. 4A and FIG. 4B, the device configuration in the second embodiment is the same as in the first embodiment, but the second embodiment differs from the first embodiment in that a hydrogen gas is supplied to an anode-side electrode 52, while a nitrogen gas as an inert gas is supplied to a cathode-side electrode 53. In this embodiment, although different from the first embodiment in that an inspection object MEA is in the state where the hydrogen gas is present at the anode-side electrode 52 and the nitrogen gas is present at the cathode-side electrode 53, a current is, in this gas state, applied from an external power supply unit 110 to the anode-side electrode 52 and the cathode-side electrode 53 so that the anode-side electrode 52 has a higher potential and that the current value gradually increases. Accordingly, at the high-potential anode-side electrode 52 where the hydrogen gas is present, a hydrogen molecule is ionized into protons ($H^+$) and electrons ($e^-$) as exemplarily shown in FIG. 4B. The ionized protons move from the anode-side electrode 52 to the cathode-side electrode 53 through an electrolyte membrane 51. The protons thus moved are bonded together to become a hydrogen molecule at the cathode-side electrode 53 where the nitrogen gas is present. Since the chemical reactions at the anode-side electrode 52 and the cathode-side electrode 53 across the electrolyte membrane 51 occur only based on the movement of the protons, the progress of the chemical reactions at both electrodes is affected by the degree of proton conductivity of the electrolyte membrane 51, i.e. the state of contamination of the electrolyte membrane 51.

The chemical reactions at both electrodes across the electrolyte membrane 51 occur at any current value of the current applied from the external power supply unit 110. In the case of the MEA having the electrolyte membrane 51 with normal proton conductivity (non-defective MEA), the measured potential difference measured between the anode-side electrode 52 and the cathode-side electrode 53 by a voltage measurement unit 120 at any current value is equal to or only differs within a predetermined range from an initial potential difference which is a potential difference between the anode-side electrode 52 and the cathode-side electrode 53 before the current application in the state where the hydrogen gas is present at the anode-side electrode 52 and the nitrogen gas is present at the cathode-side electrode 53. This state is shown as NON-DEFECTIVE MEA/VOLTAGE LOCUS in the voltage transition in FIG. 5B.

On the other hand, in the case of the MEA having the electrolyte membrane 51 with proton conductivity hindered by contamination (defective MEA), the production of hydrogen molecules by bonding of the protons at the cathode-side electrode 53 due to the movement of the protons is difficult to occur so that non-bonding of the protons is actualized as the current increases, thus leading to a voltage decrease ($\Delta V_{HN}$) in the measured voltage measured between the anode-side electrode 52 and the cathode-side electrode 53. This state is shown as DEFECTIVE MEA/VOLTAGE LOCUS in the voltage transition in FIG. 5B. A control device 200 stores, in a correlated manner, degrees of the voltage decrease ($\Delta V_{HN}$) and defective/non-defective determination results in a predetermined memory. Accordingly, if the measured potential difference when the current of a predetermined current value is applied is a potential difference that is largely reduced by a predetermined amount or more from the above-described initial potential difference, specifically, if the voltage decrease ($\Delta V_{HN}$) when the current of a predetermined current value is applied is less than a predetermined potential difference, the control device 200 can determine that the inspection object MEA has a power generation performance defect due to the property of the electrolyte membrane 51, i.e. the hindrance of the proton conductivity of the electrolyte membrane 51 by contamination. On the other hand, if the potential difference ($\Delta V_{HN}$) when the current of a predetermined current value is applied falls within a predetermined voltage range or shows no potential difference decrease, the control device 200 can determine that the inspection object MEA has no power generation performance defect due to the property of the electrolyte membrane 51 and thus is non-defective. The defective/non-defective determination in this embodiment is also a result of inspection based on the measured potential difference when the current of a predetermined current value is applied and the initial potential difference which is a potential difference between both electrodes before the current application. After the completion of the inspection, the MEA is extracted and the non-defective MEA is incorporated into a power generation cell so as to be a constituent member of a fuel cell. Since the measured potential differences are affected by the thickness of the electrolyte membrane 51 in the power generation performance inspection, the thickness of the electrolyte membrane 51 should be taken into account as described above when making an inspection determination.

As described above, also according to the fuel cell inspection method of this embodiment, the quality of the power generation performance derived from the property of the electrolyte membrane 51 can be easily inspected by the sequence of supplying a hydrogen gas to the anode-side electrode 52 and a nitrogen gas to the cathode-side electrode 53, applying a current to both electrodes under the supply of these gases, and measuring a voltage between both electrodes when the current of a predetermined current value is applied thereto.

Figure 6A:
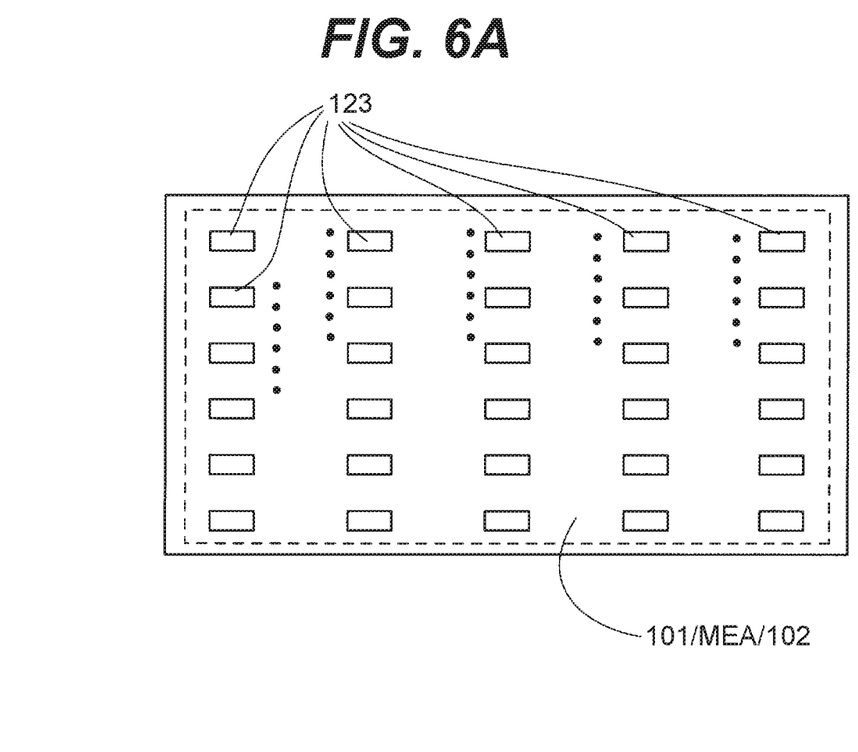
FIG. 6A and FIG. 6B are explanatory diagrams showing an outline of a fuel cell inspection method according to another embodiment.
Figure 6B:
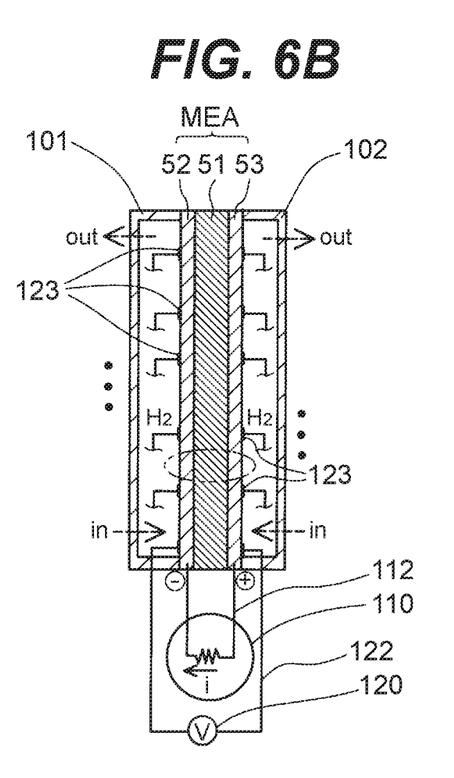

Next, another embodiment will be described. FIG. 6A and FIG. 6B are explanatory diagrams showing an outline of a fuel cell inspection method according to another embodiment. As shown in FIG. 6A and FIG. 6B, in this embodiment, electrode parts 123 as voltage measurement points by a voltage measurement unit 120 are provided in a matrix of m rows and n columns (6 rows and 5 columns in FIG. 6A) at each of an anode-side electrode 52 and a cathode-side electrode 53 disposed on an opposite side of the electrolyte membrane 51 from the anode-side electrode 52, thereby obtaining voltages from the respective electrode parts 123 to measure the voltages for the respective electrode parts 123. Consequently, since the state of good and bad distributions in the plane of an electrolyte membrane 51 is elucidated, it is possible to enhance the defective/non-defective determination accuracy of the electrolyte membrane 51. For example, even if there are observed large potential differences ($\Delta V_{HH}/\Delta V_{HN}$) with respect to the electrode parts 123 at about 1 to 3 positions, thus determined to be defective, if there is observed no potential difference decrease with respect to the electrode parts 123 at the other positions, thus determined to be non-defective in performance, the electrolyte membrane 51 as a whole can be determined to be non-defective in performance. Conversely, if there are observed large potential differences ($\Delta V_{HH}/\Delta V_{HN}$) with respect to the electrode parts 123 at 30% or more of m×n positions, thus determined to be defective, even if there is observed no potential difference decrease with respect to the electrode parts 123 at the other positions, the electrolyte membrane 51 as a whole can be determined to be defective in performance.

Figure 7:
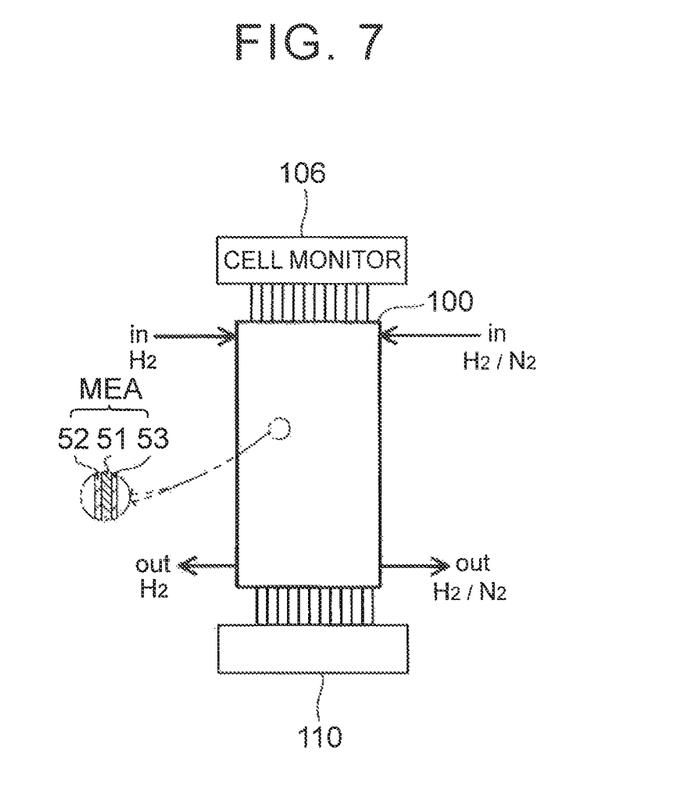
FIG. 7 is an explanatory diagram schematically showing a state of carrying out a performance inspection using, as an inspection object, a fuel cell as a finished product in which a plurality of battery cells are stacked together.

Next, a description will be given of a state of performance inspection of a fuel cell in which battery cells are stacked together. FIG. 7 is an explanatory diagram schematically showing a state of carrying out a performance inspection using, as an inspection object, a fuel cell as a finished product in which a plurality of battery cells are stacked together. As shown in FIG. 7, in this embodiment, a fuel cell 100 is used as an inspection object. The fuel cell 100 is formed by stacking together a plurality of battery cells in each of which a MEA having an electrolyte membrane 51 sandwiched between an anode-side electrode 52 and a cathode-side electrode 53 is further sandwiched between gas diffusion members and further between separators, and is a finished product that is incorporated into, for example, a fuel cell equipped vehicle or a fuel cell power generation system. Even in the case where the fuel cell 100 is used as the inspection object, a hydrogen gas is continuously supplied to the anode side of the fuel cell 100 from the stack outside, while a hydrogen gas or a nitrogen gas is continuously supplied to the cathode side of the fuel cell 100 from the stack outside. In this state, a current is applied from an external power supply unit 110 to the anode-side electrode 52 and the cathode-side electrode 53 of each battery cell so that the anode-side electrode 52 of each battery cell has a higher potential and that the current value gradually increases. Then, a voltage between the anode-side electrode 52 and the cathode-side electrode 53 of each battery cell is measured by a cell monitor 106. According to an inspection method of this configuration, it is possible to inspect, based on the degrees of proton conductivity of the electrolyte membranes 51, whether the power generation performance of the fuel cell 100 as a whole is good or bad. Further, since the quality of the power generation performance can be inspected for each of the power generation cells forming the fuel cell 100 based on the degree of proton conductivity of the electrolyte membrane 51, the power generation performance of the fuel cell 100 as a whole can be maintained or improved by replacing such a power generation cell specified to be defective in power generation performance.

It may be configured that a hydrogen gas is supplied also to the cathode-side electrode 53. With this configuration, an inert gas purge is not required after inspecting the fuel cell 100 as a finished product and, therefore, it is possible to reduce the number of inspection steps and the inspection cost.

The invention is not limited to the above-described embodiments and can be embodied in various configurations within a range not departing from its gist. For example, the technical features of the embodiments corresponding to the technical features in the modes described in the column of SUMMARY OF THE INVENTION can be replaced or combined as appropriate in order to solve a part or all of the above-described problems or achieve a part or all of the above-described effects. Further, unless such a technical feature is described as essential in this specification, it can be eliminated as appropriate.

In the above-described embodiments, the MEA or the fuel cell 100 is used as the inspection object. Instead, a MEGA (Membrane Electrode & Gas Diffusion Layer Assembly) in which a MEA is sandwiched between anode-side and cathode-side gas diffusion members may be used as an inspection object.

In the above-described embodiments, a hydrogen gas is supplied to the anode-side electrode 52, while one of a hydrogen gas and a nitrogen gas is supplied to the cathode-side electrode 53. Alternatively, a hydrogen gas may be supplied to the cathode-side electrode 53, while one of a hydrogen gas and a nitrogen gas may be supplied to the anode-side electrode 52, and a current may be applied to both electrodes so that the cathode-side electrode 53 has a higher potential.

What is claimed is:

1. An inspection method of a fuel cell in which an electrolyte membrane is sandwiched between an anode-side electrode and a cathode-side electrode, comprising:
   supplying a hydrogen gas to one of the anode-side electrode and the cathode-side electrode and supplying the hydrogen gas or an inert gas to the other electrode;
   applying a current from an external power supply to the one electrode and the other electrode so that the one electrode has a higher potential, and measuring a potential difference between the one electrode and the other electrode; and
   inspecting a performance of the fuel cell based on the potential difference between the one electrode and the other electrode measured when the current of a predetermined current value is applied from the external power supply to the one electrode and the other electrode, and an initial potential difference which is a potential difference between the one electrode and the other electrode before applying the current from the external power supply to the one electrode and the other electrode.

2. The inspection method according to claim 1, wherein when supplying the hydrogen gas to the one of the anode-side electrode and the cathode-side electrode and supplying the hydrogen gas or the inert gas to the other electrode, the hydrogen gas is supplied to both the anode-side electrode and the cathode-side electrode.

3. The inspection method according to claim 1, wherein the current is applied to the anode-side electrode and the cathode-side electrode so that the current value gradually increases.

4. The inspection method according to claim 1, wherein when supplying the hydrogen gas to the one of the anode-side electrode and the cathode-side electrode and supplying the hydrogen gas or the inert gas to the other electrode, the hydrogen gas is supplied to the anode-side electrode and the inert gas is supplied to the cathode-side electrode.

5. The inspection method according to claim 1, wherein electrode parts as voltage measurement points by a voltage measurement unit are provided in a matrix at each of the anode-side electrode and the cathode-side electrode disposed on an opposite side of the electrolyte membrane from the anode-side electrode, thereby obtaining voltages from the respective electrode parts to measure the voltages for the respective electrode parts.

\* \* \* \* \*